(12) United States Patent
Lang

(10) Patent No.: US 8,359,660 B2
(45) Date of Patent: Jan. 22, 2013

(54) METHOD AND APPARATUS OF SECURING DATA IN A PORTABLE FLASH MEMORY

(75) Inventor: Michael James Lang, Huntingdon (GB)

(73) Assignee: LPS2, Potomac, MD (US)

( * ) Notice: Subject to any disclaimer, the term of this patent is extended or adjusted under 35 U.S.C. 154(b) by 287 days.

(21) Appl. No.: 12/591,689

(22) Filed: Nov. 30, 2009

(65) Prior Publication Data
US 2011/0131649 A1    Jun. 2, 2011

(51) Int. Cl.
G06F 21/00 (2006.01)
(52) U.S. Cl. ......................................................... 726/34
(58) Field of Classification Search .................... 726/19, 726/26, 27, 34; 713/182, 193, 185
See application file for complete search history.

(56) References Cited

U.S. PATENT DOCUMENTS

| | | | |
|---|---|---|---|
| 2003/0173408 A1* | 9/2003 | Mosher et al. | ................. 235/492 |
| 2005/0015629 A1 | 1/2005 | Wang | |
| 2006/0036872 A1 | 2/2006 | Yen | |
| 2006/0107317 A1 | 5/2006 | Moran | |
| 2007/0016743 A1 | 1/2007 | Jevans | |
| 2007/0112981 A1 | 5/2007 | Hernandez | |
| 2007/0214369 A1 | 9/2007 | Roberts | |
| 2007/0250924 A1* | 10/2007 | Ono et al. | ........................ 726/19 |
| 2008/0005561 A1* | 1/2008 | Brown et al. | ................. 713/164 |
| 2008/0066174 A1 | 3/2008 | Miller | |
| 2008/0209222 A1* | 8/2008 | Narayanaswami et al. ... 713/184 | |

* cited by examiner

Primary Examiner — Edward Zee
(74) Attorney, Agent, or Firm — Emdadi Patent Law; Kamran Emdadi (57) ABSTRACT

A method and apparatus of securing data stored in a memory of a portable memory storage device are disclosed. One example may include activating an authentication detection component of the portable memory storage device, and verifying an authentication key via the authentication detection component of the portable memory storage device. Once the authentication is complete, additional operations may include interfacing the portable memory storage device with a computing device and accessing data stored in the memory device. Upon ending the access operation, the discontinuing of the interfacing of the memory storage device with the computing device will automatically lock the memory storage device after a predetermined time has passed.

11 Claims, 7 Drawing Sheets

FIG. 7

METHOD AND APPARATUS OF SECURING DATA IN A PORTABLE FLASH MEMORY

TECHNICAL FIELD OF THE INVENTION

This invention relates to a method and apparatus of providing data security protection to portable mass storage data devices.

BACKGROUND OF THE INVENTION

Conventional flash memory devices, such as, a universal serial bus (USB) interface memory device, are commonly used to store data. These flash memories have large storage capacities, compact features, and are compatible with the standard data transmission USB interface of a computer processing device. As a result, the USB flash drive, or finger operated "thumbdrive", has become a popular choice for a portable storage medium.

The practicality and convenience of the USB flash drive is apparent by its easy to use interface, compact design, and relative affordability. However, with the increase in security measures required to protect data from being accessed by unauthorized personnel, the data security measures currently being implemented to protect everyday user data are not satisfactory. Furthermore, the currently used portable memory devices may provide long-term storage of personal and/or sensitive data, which, over time, may be easily misplaced or stolen.

Attempts to provide security for removable storage drives have not been widely accepted or implemented by the everyday user. Examples of widely accepted security measures may include, encryption, password protection and physical locking mechanisms which may be easily defeated by tampering, hacking and breaking open a storage device casing to gain access to the stored data. Also, biometric scans of fingerprints have also been used to protect unauthorized access to data. However, such security measures have been deemed untrustworthy as they are easily overcome by those seeking unauthorized access to data.

As the market demand for mass storage devices continues to increase, the affordability, simplicity, security and ease of operation are all tantamount to the future of portable mass storage devices.

SUMMARY OF THE INVENTION

One example embodiment of the present invention may include a method of securing data stored in a memory of a portable memory storage device. The method may include activating an authentication detection component of the portable memory storage device, verifying an authentication key via the authentication detection component of the portable memory storage device, interfacing the portable memory storage device with a computing device and performing at least one of accessing data stored in the memory device, adding data to the memory device and erasing data stored in the memory device. The method may also include discontinuing the interfacing of the memory storage device with the computing device and automatically locking the memory storage device after a predetermined time has passed since the interfacing of the memory storage device and the computing device has been discontinued.

Another example embodiment of the present invention may include an apparatus configured to secure data stored in its memory. The apparatus may include an authentication detection component configured to verify an authentication key. The apparatus may also include an interface configured to interface with a computing device to provide at least one of access to data stored in the memory, add data to the memory, and erase data stored in the memory, and wherein when the interface loses a connection with the computing device, access to the memory is locked after a predetermined time has passed since the connection was lost.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
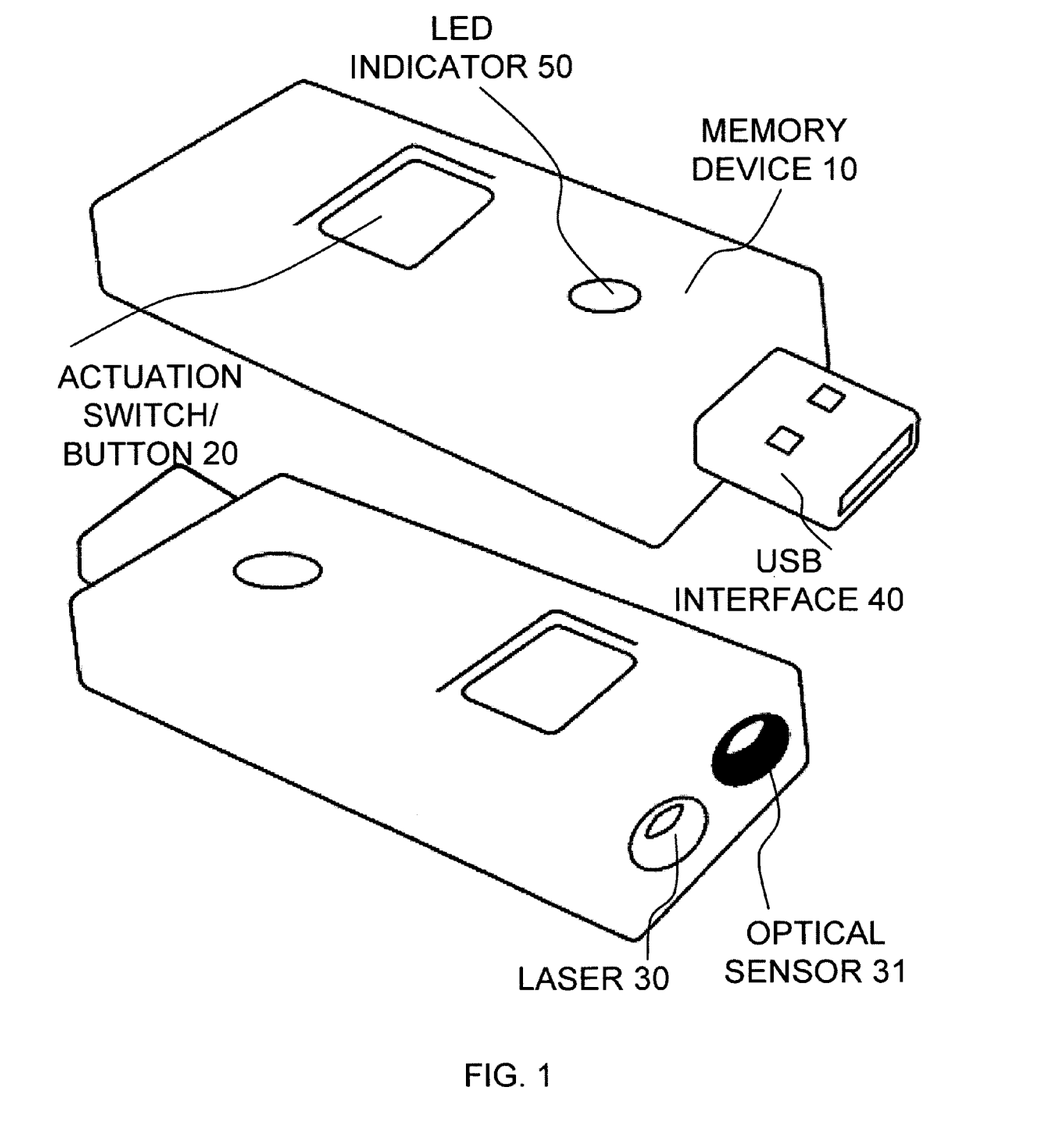
FIG. 1 illustrates example perspectives of the memory storage device, according to an example embodiment of the present invention.

FIG. 1 illustrates an example memory device 10, according to example embodiments of the present invention. Referring to FIG. 1, the memory device 10 is illustrated twice to show front and rear perspectives of the same memory device 10. The memory device 10 includes an actuation switch or button 20, a light emitting diode (LED) indicator 50, a laser 30 and an optical sensor 31.

The LED 50 could be a standard colored or multi-colored LED indicator used to provide the user with a light indication as to whether the device is operable or inoperable. For instance, the LED 50 could display a red light when an incorrect bar code is scanned by the scanner laser 30 and read by the optical sensor 31. Or, a green light may be illuminated when the correct bar code is scanned and read. The laser 30 and optical sensor 31 may be used to perform bar code recognition, character recognition and/or biometric recognition. However, for example purposes of the present invention, the laser 30 and optical sensor 31 will be used to perform bar code recognition.

Figure 2:
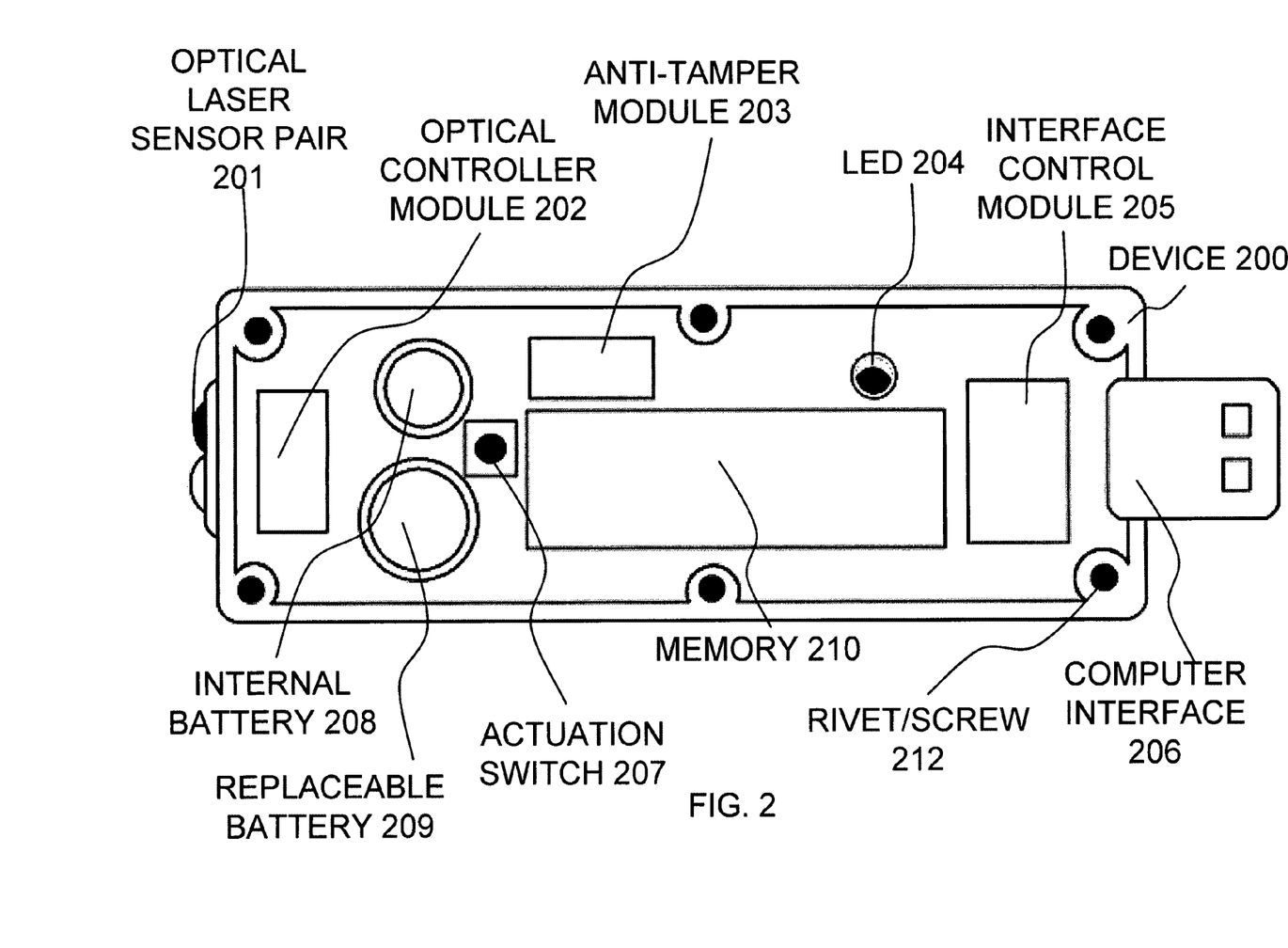
FIG. 2 illustrates the internal components of the memory storage device, according to an example embodiment of the present invention.

FIG. 2 illustrates the internal components and circuitry of the memory storage device 10 of FIG. 1, according to example embodiments of the present invention. Referring to FIG. 2, the device 200 includes an optical laser and sensor pair 201, an optical controller module 202, an anti-tamper module 203, an LED 204, an interface control module 205, a computer interface 206, a memory 210, an actuation switch 207, a replaceable battery 209, and an internal battery 208.

The optical sensor 201 is used to scan the bar code data and provide the data to the optical controller module 202 which translates the data into a numerical or alpha-numerical code. For example, the laser beam emitted by the laser may include a reciprocating mirror or a rotating prism to scan the laser beam back and forth across the bar code. The optical sensor may include a photo diode that is used to measure the intensity of the light reflected back from the bar code. The light emitted by the reader is tuned to a specific frequency and the photo diode is designed to detect only this same frequency light. The optical controller module 202 may include a processing chip or microprocessor that is capable of deciphering the analog result of the optical sensor and laser pair 201.

The LED 204 is used to provide the user with feedback regarding the current status of the memory device 200. For example, when the bar code scanned and processed by the optical controller 202 and laser/sensor pair 201 matches a code that is pre-stored in the memory 210 of the device 200, the LED 204 will emit a green light. Alternatively, if the bar code processed does not match the bar code pre-stored in the memory 210, then the LED 204 will emit a red light indicating that the device is still locked.

The interface control module 205 provides an interface that is capable of communicating with a computer or other computer device having a computer readable medium and interface to communicate with the memory device 200. In the example illustrated in FIG. 2, the computer interface 206 is a USB interface, and the interface control module 205 will have a standard type-A or type-B USB interface which are commonly used to interface to a computing device. Alternatively, other types of interfaces may be used to interface with the computing device, examples of which are described in further detail below.

The memory 210 may include any of random access memory ("RAM"), flash memory, read-only memory ("ROM"), erasable programmable read-only memory ("EPROM"), electrically erasable programmable read-only memory ("EEPROM"). In a preferred embodiment of the present invention the memory will include RAM which is easily erasable and recordable. The pre-stored bar code may be stored in the same RAM of the memory 210 as the memory that is used to store data by the user. The pre-stored bar code may be stored in a read-only file that is not easily erasable by the user.

An internal battery 208, such as, a lithium-ion battery may provide life-long power to maintain the basic operations of the memory device 200. Another separate replaceable battery 209 may be used to power the LED 204 and the optical sensor 201, along with other components of the device 200. The internal battery 208 may be rechargeable by the computer interface 206.

The anti-tamper module 203 may be interfaced with the internal battery 208 and a wire or conduit disable circuitry 211 that is capable of disabling the memory device 200. In operation, when the memory device 200 has yet to scan the proper bar code, or, multiple failed attempts have been counted by the anti-tamper module 203, the disable circuitry will be enabled to effectively disable the computer interface 206 and the interface control module 205. This will disable access to the contents of the memory 210 which locks out users who have not properly enabled the device.

Figure 3:
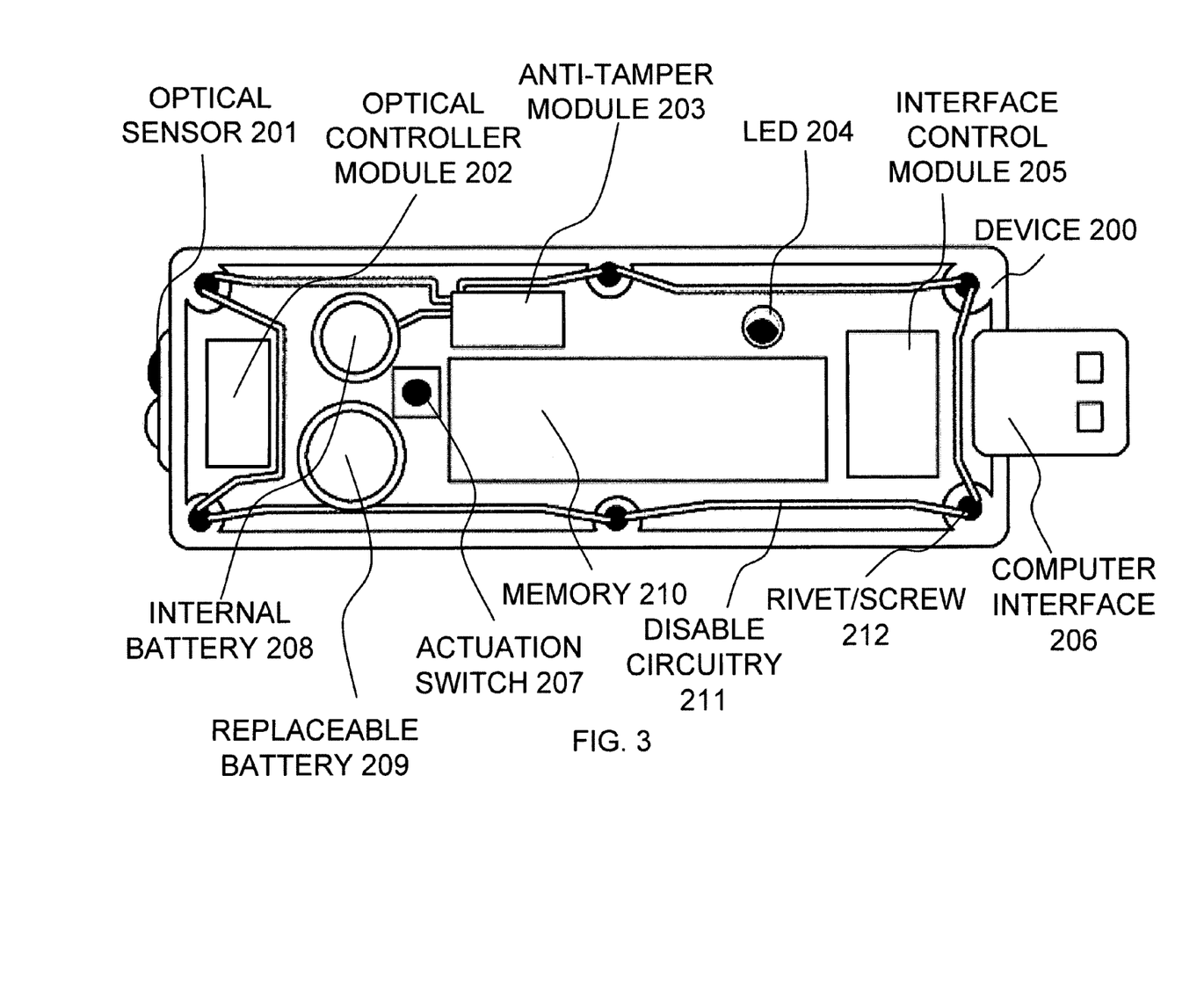
FIG. 3 illustrates the internal components of the memory storage device with the disable circuitry in an active state, according to an example embodiment of the present invention.

The disable circuitry 211 may disable access to the memory by detecting a break in the circuit, which may occur from the device being cracked, bent, or, simply from a screw/rivet 212 being removed from the casing of the memory device 200. For example, the screw/rivet 212 may be part of the circuit that maintains control of the memory 210. When a screw/rivet 212 is removed, the disable circuitry 211 will be an open circuit which will enable a rewrite or format operation to occur on the contents of the memory 210. This format operation will essentially remove all of the contents of the memory so that the user tampering with the device will not be able to access the contents of the memory 210. The disable circuitry 211 may be in an active state when the circuit is closed, and may switch to an inactive state when the circuit is opened due to tampering.

Figure 4:
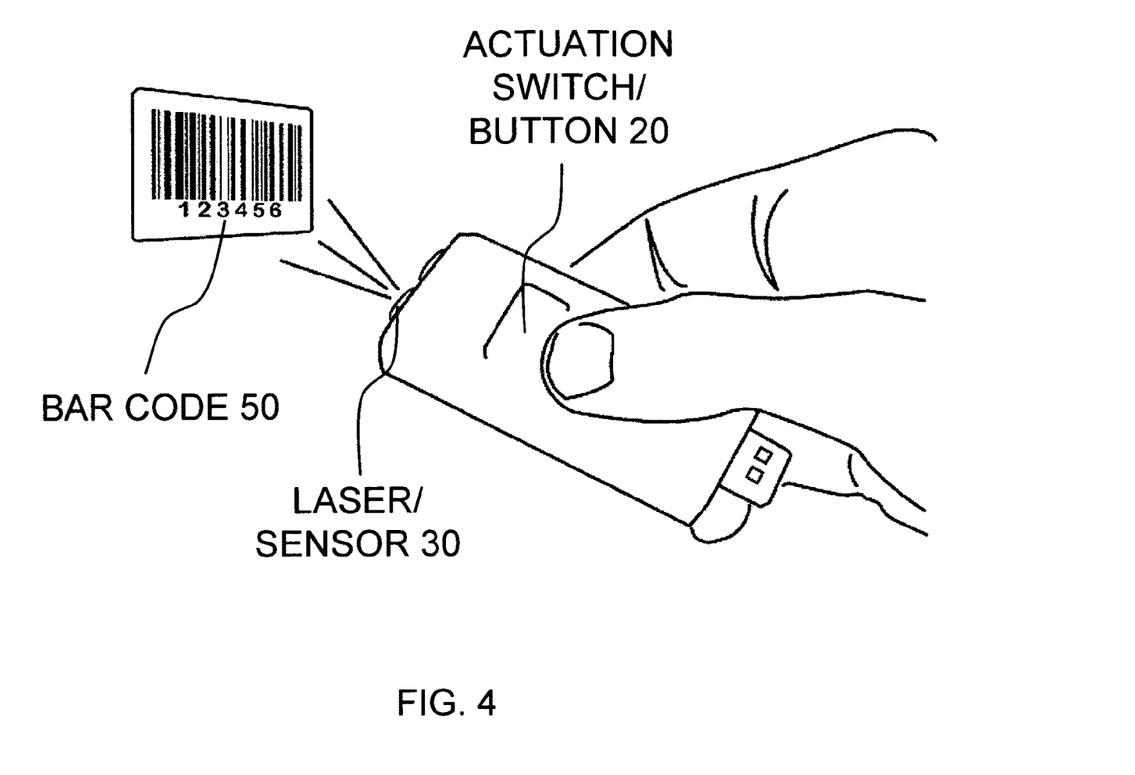
FIG. 4 illustrates the example operation of the memory storage device, according to an example embodiment of the present invention.

FIG. 4 illustrates one example operation according to example embodiments of the present invention. Referring to FIG. 4, the user may setup the memory device 200 or reconfigure the memory device 200 by pressing the button 20 which activates the actuation switch 207. For instance, the user may push and hold the button 20 for a predetermined amount of time (i.e., 3 seconds), which will enable the laser/sensor pair 201. A new barcode 50 or "key" may then be scanned as the new security measure required to be scanned before the memory device is capable of operating. Assuming it an initial setup procedure, then the push and hold procedure may erase and/or format all of the contents of the memory 210.

The bar code keys may be printed out via an online support website or database. Alternatively, the bar codes may be printed out from a central bar code generation machine that is maintained by the security administration personnel that regulates the use of the memory device 200. The codes may be printed out from a printer two or three at a time so the user may keep one in a safe place and the other in a secure location that user is likely to operate the memory device 200.

After the initial setup procedure, the user may access the data or add data to the device by pushing the button 20 and waiting for a predetermined amount of time (e.g., three seconds). The laser may then be activated and the bar code may be scanned. Once the correct bar code is matched against a pre-stored bar code identified in the device's memory, the device may be unlocked and activated for a predetermined amount of time (e.g, 10-15 seconds). Also, the device 200 may detect the loss of voltage from the computer interface (e.g, USB) and automatically lock itself when the voltage drops. After the activation period has expired, the device will automatically lapse into a disable state that again locks the device 200 from being accessed by enabling the disable circuitry 211.

Once the device 200 has been locked, the correct bar code 50 must be scanned in order to unlock the device 200. If a third party steals the device and attempts to access the stored data, the device will not be accessible until the correct bar code is scanned. If the third party scans an improper barcode a predetermined number of times (e.g., three times), the device may automatically erase and/or format the entire contents of the memory 210.

Assuming the owner of the device has lost the bar code, the master unlock bar code may be ordered online or via email or other suitable communication medium by logging on to a registration database that requires personal user information and passwords, etc. Once the user has satisfied the requirements of the manufacturer's support system, the master unlock bar code that will unlock the device may be released from the manufacturer and emailed to the user so it may be printed out via a printer, and scanned so the user may continue using the memory device 200. Or, the device 200 may have to be mailed back to the manufacturer depending on the security agreement desired by the user.

Figure 5:
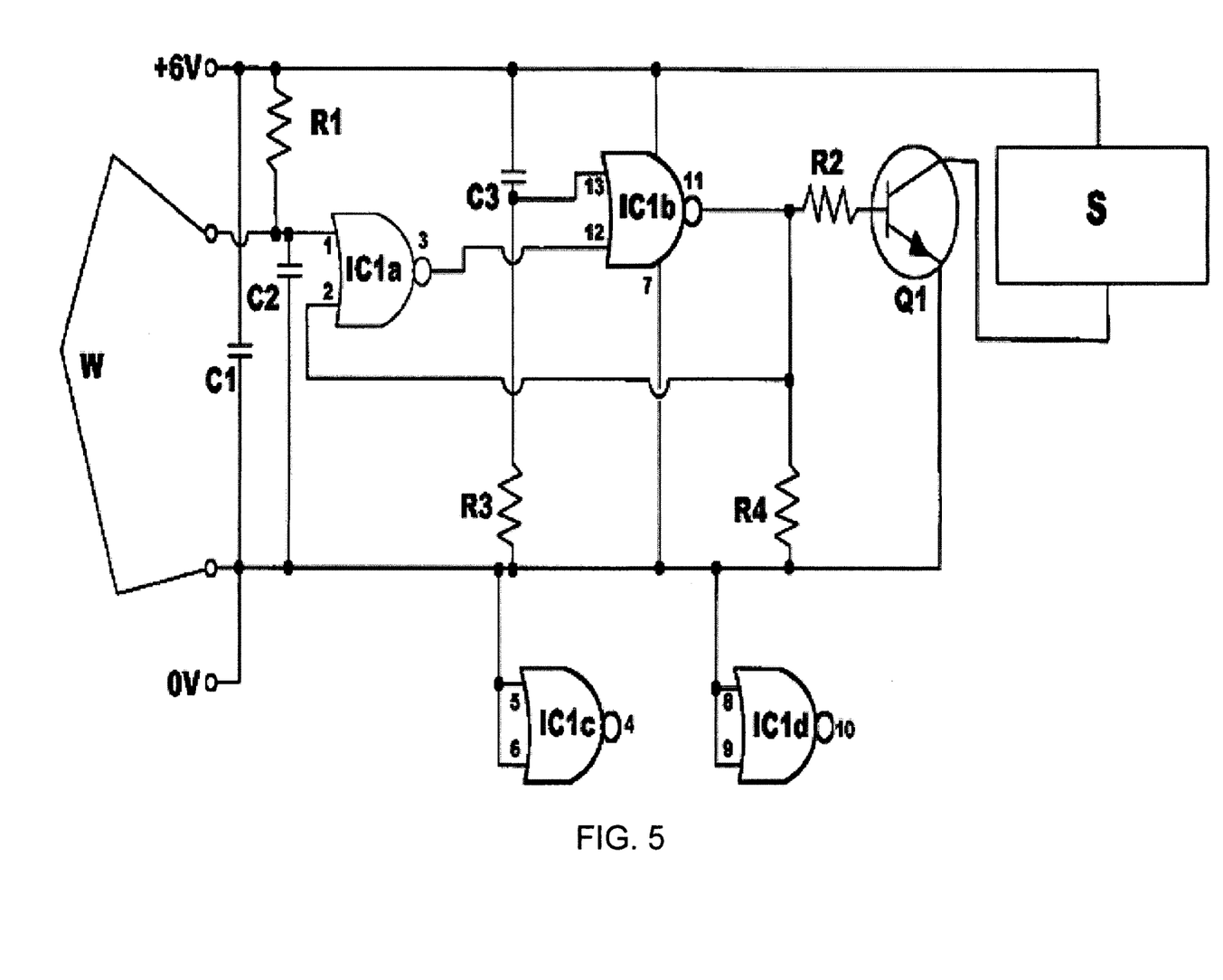
FIG. 5 illustrates the internal components of the disable circuitry of the memory storage device, according to an example embodiment of the present invention.

FIG. 5 illustrates an example control circuit, according to example embodiments of the present invention. Referring to FIG. 5, the circuit includes logic gates IC1*a*-IC1*d*, resistors R1-R4, transistor Q1, capacitors C1-C3, breakable circuit W, and tamper initiating voltage connection S. This circuit may be included in the anti-tamper module 203 of the memory device 200.

In operation, when any of the screws/rivets 212 have been removed, the circuit W will break and the anti-tamper module 203 will signal via a positive voltage (e.g., 6 volts) through the connection S to the interface control module 205. As a result, the interface control module 205 will signal an erase and/or format operation that removes all data from the memory 210.

Figure 6:
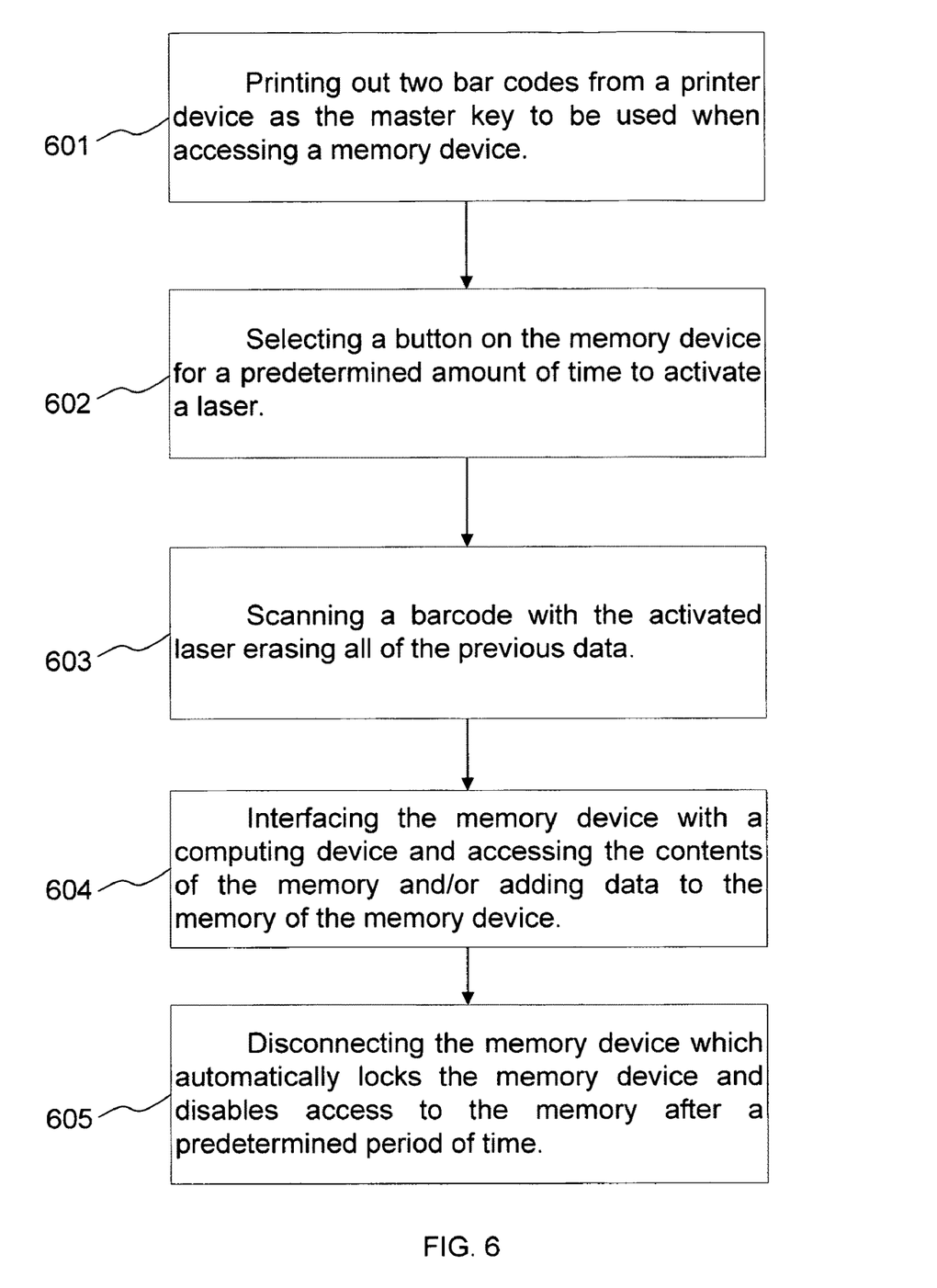
FIG. 6 illustrates an example method flow diagram of the operation of the memory storage device, according to an example embodiment of the present invention.

FIG. 6 illustrates an example method of the initial setup or reconfiguration procedure of setting up the memory device for operation. The user may print out two bar codes from a printer device as the master key to be used when accessing the memory device, at operation 601. Next, the user may press the button on the memory device for a predetermined amount of time to activate the laser, at operation 602. The user may then scan the barcode with the activated laser, which will erase all of the previous data, at operation 603. The user may then insert the memory device into a computing device and begin accessing the contents of the memory and/or add data to the memory of the memory device, at operation 604. The user may then disconnect the memory device, and the loss of voltage will automatically lock the memory device and disable access to the memory after a predetermined period of time, at operation 605.

Figure 7:
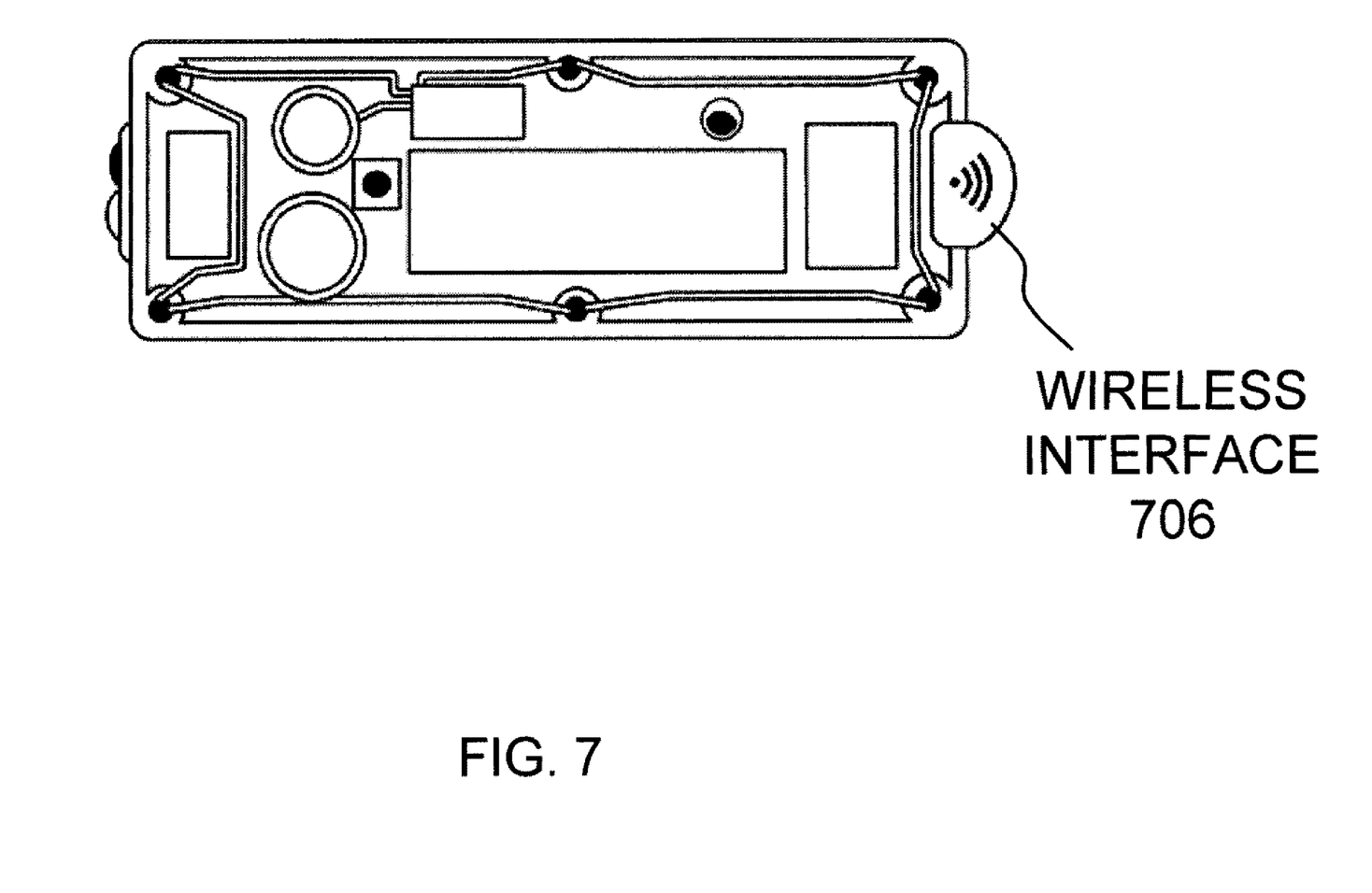
FIG. 7 illustrates an alternative embodiment of the interface of the memory storage device, according to an example embodiment of the present invention.

FIG. 7 illustrates an example alternative embodiment of the present invention. For example, instead of the USB interface of FIG. 2, the memory device may have a wireless Bluetooth or IEEE 802.x wireless interface that wirelessly communicates with a wireless network interface of the computing device to transfer and receive data via a wireless medium. Other embodiments may include a memory device that interfaces with a computing device via any commonly accepted interface connection.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of securing data stored in a memory of a memory storage device, the method comprising:
    activating an authentication detection component of the memory storage device;
    verifying an authentication key via the authentication detection component of the memory storage device;
    interfacing the memory storage device with a computing device and performing at least one of accessing data stored in the memory storage device, adding data to the memory storage device and erasing data stored in the memory storage device;
    discontinuing the interfacing of the memory storage device with the computing device and automatically locking the memory storage device after a predetermined time has passed since the interfacing of the memory storage device and the computing device has been discontinued, wherein the locking of the memory storage device comprises lapsing after the predetermined time has passed into a disable state;
    enabling a circuit to lock the memory storage device to prevent access to the memory;
    detecting a removal of a portion of the memory storage device, and wherein the portion of the memory storage device comprises at least one screw among a plurality of screws used to bind the memory storage device together, wherein each of the plurality of screws are in electrical contact with a disable circuitry conduit that is in electrical contact with an anti-tamper module that triggers an erase memory signal responsive to the detecting of the portion of the memory storage device being removed; and
    enabling a voltage signal via the anti-tamper module to be transmitted to an interface control module which provides the erase memory signal that erases all data stored in the memory responsive to the portion of the memory storage device being removed.

2. The method of claim 1, wherein the authentication detection component is a laser bar code reader and the authentication key is a bar code.

3. The method of claim 1, wherein the verifying operation provides temporary access to the memory storage device for a predetermined amount of time.

4. The method of claim 1, further comprising:
    performing an additional verifying operation that erases all of the data presently stored in the memory of the memory storage device.

5. The method of claim 1, wherein the interfacing is performed via at least one of a universal serial bus interface and a wireless interface.

6. The method of claim 1, wherein the activating operation is performed by pressing a button on the memory storage device and holding the button for a predetermined period.

7. An apparatus configured to secure data, the apparatus comprising:
    a memory configured to store the secure data;
    an authentication detection component configured to verify an authentication key;
    an interface configured to interface with a computing device to provide at least one of access to data stored in the memory, add data to the memory, and erase data stored in the memory, and wherein when the interface loses a connection with the computing device, access to the memory is locked after a predetermined time has passed since the connection was lost, wherein the access to the memory is locked as a result of a disable state that occurs after the predetermined time has passed;
    a device housing configured to house all of the components of the apparatus;
    an anti-tamper module that detects a removal of a portion of the device housing, and wherein the portion of the device housing comprises at least one screw among a plurality of screws used to bind the device housing together, wherein each of the plurality of screws are in electrical contact with a disable circuitry conduit that is in electrical contact with the anti-tamper module that triggers an erase memory signal responsive to the detection of the portion of the device housing being removed; and a circuit that is configured to lock the memory to prevent access to the memory, and enable a voltage signal via the anti-tamper module to be transmitted to an interface control module which provides the erase memory signal that erases all data stored in the memory responsive to the portion of the device housing being removed.

8. The apparatus of claim 7, wherein the authentication detection component is a laser bar code reader and the authentication key is a bar code.

9. The apparatus of claim 7, wherein once a verification is complete, temporary access to the memory is allowed for a predetermined amount of time.

10. The apparatus of claim 7, wherein the interface is at least one of a universal serial bus interface and a wireless antenna interface.

11. The apparatus of claim 7, further comprising:
an optical sensor laser that is used to perform a verification of a bar code.

* * * * *